United States Patent
Holecek et al.

(10) Patent No.: US 9,616,582 B2
(45) Date of Patent: Apr. 11, 2017

(54) HANDLING SYSTEM AND METHOD OF OPERATING A HANDLING SYSTEM

(71) Applicant: J. Schmalz GmbH, Glatten (DE)

(72) Inventors: Thomas Holecek, Freudenstadt (DE); Walter Dunkmann, Baden-Baden (DE)

(73) Assignee: J. Schmalz GmbH, Glatten (DE)

( * ) Notice: Subject to any disclaimer, the term of this patent is extended or adjusted under 35 U.S.C. 154(b) by 98 days.

(21) Appl. No.: 14/668,161

(22) Filed: Mar. 25, 2015

(65) Prior Publication Data
US 2015/0283707 A1    Oct. 8, 2015

(30) Foreign Application Priority Data

Apr. 2, 2014   (DE) .................. 10 2014 206 308

(51) Int. Cl.
  *B25J 15/06* (2006.01)
  *B25J 19/02* (2006.01)
  *B25J 15/04* (2006.01)

(52) U.S. Cl.
  CPC ....... *B25J 15/0616* (2013.01); *B25J 15/0483* (2013.01); *B25J 15/0675* (2013.01); *B25J 19/02* (2013.01)

(58) Field of Classification Search
  CPC .. B65G 47/917; B65G 47/918; B25J 15/0625; B25J 15/0616; B25J 13/082; B25J 19/02; B25J 15/0675; B25J 15/0483; H01L 21/6838; B66C 1/02; B62D 57/032
  USPC ........ 294/185, 186, 64.2, 183, 65, 188, 907; 269/21; 901/40, 46; 414/627, 737
  See application file for complete search history.

(56) References Cited

U.S. PATENT DOCUMENTS

| | | | | |
|---|---|---|---|---|
| 4,750,768 A | * | 6/1988 | Kumar ................. | B66C 1/0212 294/185 |
| 5,201,560 A | * | 4/1993 | Golden ................. | B65G 47/91 137/487.5 |
| 5,609,377 A | * | 3/1997 | Tanaka ................. | B65G 47/918 294/65 |
| 6,817,639 B2 | * | 11/2004 | Schmalz .............. | B25B 11/005 294/185 |
| 7,677,622 B2 | * | 3/2010 | Dunkmann ......... | B65G 47/917 294/188 |

FOREIGN PATENT DOCUMENTS

| | | |
|---|---|---|
| DE | 19817426 A1 | 10/1999 |
| EP | 2001777 B1 | 12/2008 |

* cited by examiner

*Primary Examiner* — Stephen Vu
(74) *Attorney, Agent, or Firm* — Howard & Howard Attorneys PLLC

(57) ABSTRACT

A handling system having at least one vacuum generator and an associated vacuum handling device connected to and operable via the vacuum generator. The vacuum handling device is provided with an individually assigned recognition unit including a memory device in which operating data for the vacuum handling device is storable and can be read out. Each vacuum generator has a respective sub-control unit adapted to control the vacuum generator depending on data transmitted from the recognition unit. The memory device of the recognition unit can be read out directly from the sub-control unit.

11 Claims, 1 Drawing Sheet

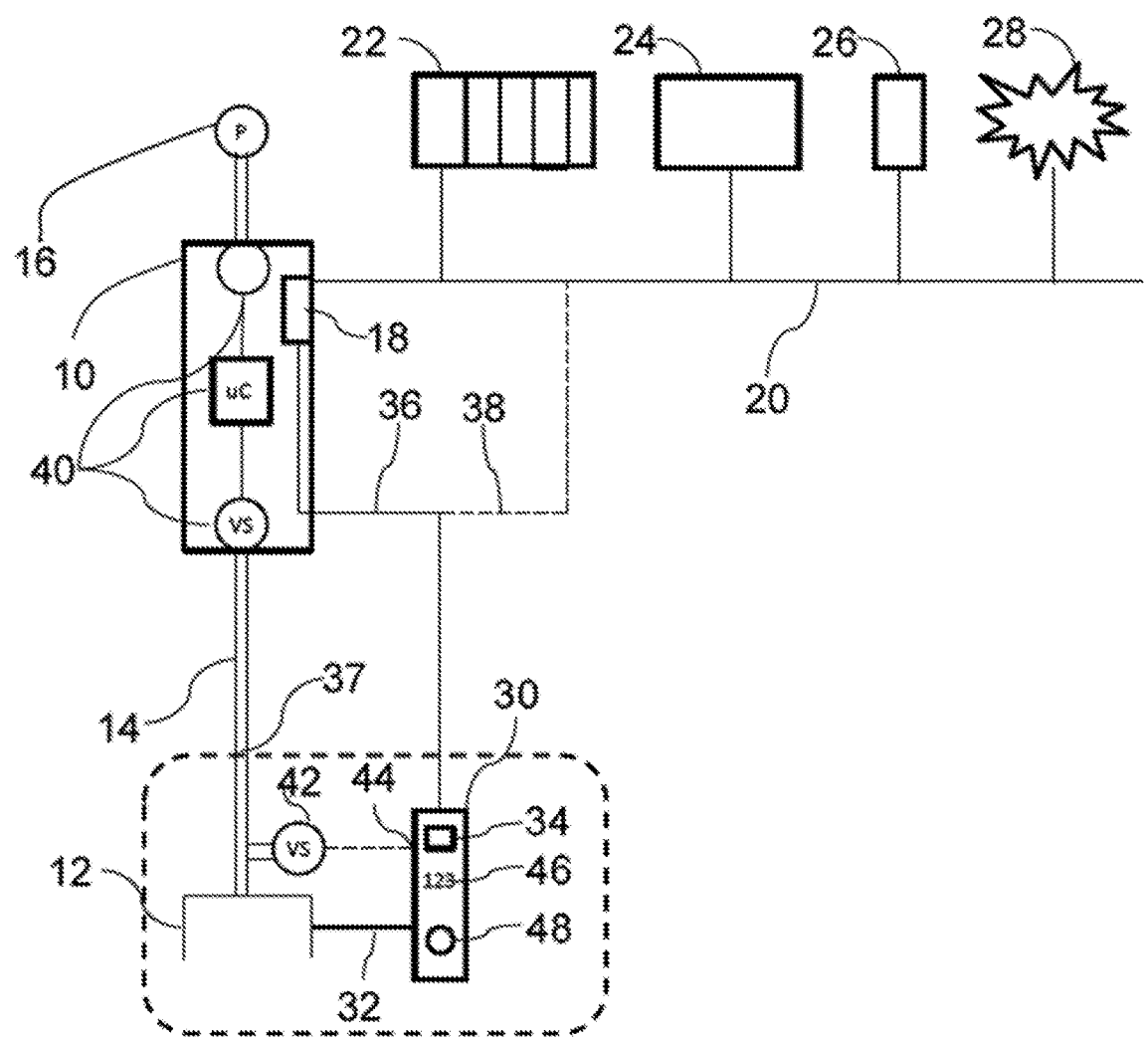

HANDLING SYSTEM AND METHOD OF OPERATING A HANDLING SYSTEM

CROSS-REFERENCE TO RELATED APPLICATION

This application is based upon and claims priority to German Patent Application No. DE 102014206308.6, filed on Apr. 2, 2014.

BACKGROUND OF THE INVENTION

1. Field of the Invention

The present invention relates, generally, to handling systems used such as in production or processing lines and, more specifically, to a handling system for handling and/or for the further transport of workpieces.

2. Description of the Related Art

Handling systems known in the related art are typically built of several functional units, in particular one or more vacuum generators and operated vacuum handling devices. In operation, the individual functional units need to be coordinated with one another. Thus, operating parameters of the handling apparatus, for example, need to known in order to facilitate control in accordance with the vacuum generator. As is known in the related art, vacuum production needs to be connected to a bus system which is connected to a central control device, which transmits control signals to the vacuum producer, and controls them in accordance with the process. The devices connected to the vacuum generator handling devices therefore need to be notified at the central controller to their respective operating parameters and status information in order to allow correct control. The controller issues the requisite operational data (such as threshold values for the mobilized vacuum or evacuation times in a gripping process) to the vacuum generator and controls the process to be carried out accordingly.

In such systems, if the handling device is replaced or changed, or when further handling devices are added, the respective new operating parameters need be entered into the central control device. This may require extensive programming steps or time-consuming process inputs. In addition, when a new handling device is added, a break-in period for the system is typically necessary to verify (and, if necessary, optimize) the operating parameters.

Published German Patent Application No. DE 198 17 426 A1 describes a vacuum gripper system that includes a plurality of gripping elements, where each gripping element is connected with a central computing and data storage unit. The central processing and data storage unit actuates each of the gripping elements and effects movement of the gripper system. The various gripping elements can also exchange data. European Patent No. EP 2001777 B1 describes a vacuum handling device that includes various components wherein at least one component has RFID data memory which contains master data about the component. The data memory can be read out by a central controller.

SUMMARY OF THE INVENTION

The invention overcomes disadvantages in the prior art in a handling system that is flexible, convertible, reliable, operable, and monitorable. The handling system includes at least one vacuum generator and at least one associated vacuum handling device (such as a suction pad, a vacuum pick-up device, a manipulator, or a pneumatically drivable machine such as a punch). The vacuum handling device has an individually assigned recognition unit which has a particular electronic storage device in which operating data for the vacuum handling device can be read out and can be stored there as well. Each vacuum generator has its own sub-control unit, which is adapted to drive the vacuum generator depending on read out data from the respective recognition unit. To this end, the storage device of the recognition unit of the sub-control unit can be read by a suitable data transfer device for direct communication between the recognition unit and the vacuum generator.

The sub-control device enables the operating characteristics of the vacuum generator to be set depending on the handling devices connected to it. To this end, the vacuum generator receives operating data directly from the associated recognition unit. The vacuum generator can then configure itself. The vacuum generator itself can obtain operating data deposited in the recognition unit which is useful to control the associated handler in a functionally correct manner. For example, from the tightness of a connected vacuum handling device, the operating characteristics can be adjusted automatically (for example: required evacuation time, and threshold sizes H1, H2).

In this respect, the vacuum generator powered by the handling device (for example, vacuum cleaners) has its own memory. This allows automatic recognition of the connected vacuum handling device by the vacuum generator. This takes place in a decentralized manner, and is possibly independent of a central control device.

The operating data represent, for example, information about the type of connected handling device. When changing the handling device, or with further expansion of the system, one can therefore dispense complex registration of the newly added handling device at the control center.

The system can have extended flexibly without expensive re-programming or data maintenance being necessary.

During operation, an optimization of the stored operational data can be carried out (for example, the vacuum generator can determine optimized operating parameters and store them in the recognition unit). The recognition unit then has constantly-saved updated operating data which are available immediately for a change or a further expansion of the device. When changing the handling device or an expansion of the device, one can thus significantly shorten the break-in required. Because the operating data is individually assigned to the handling device, an error in a complex system can be easily assigned to a particular functional unit. In addition, the operating data can contain information about individual tightness of the handler, load capacity, or service life, and provide a kind of individual resume. So, for example, a planned maintenance can be carried out on the individual handling devices.

Operating data, such as data which can provide functionally correct vacuum supply for operation of a handling device (for example, a typical threshold pressure, typical evacuation time, or a maximum achievable vacuum in the handling device) can be used as a measurement for the sealed nature of the system. The operating data can also refer to a characterization of the respective handling device (for example, reflect the place where it is used, service date, system uptime, etc). It is also conceivable to status data which reflect the current operating status and/or allow monitoring of the functionality (for example, a volume flow of flowing through the negative pressure air handling device, a cycle number, etc.). Further, the operational data may also identify data which allow an individual arrangement of the handling apparatus.

The vacuum generator and the recognition unit in particular have corresponding data transmission equipment via which data can be transferred between the vacuum generator and recognition unit (in particular, directly transferred). The transmission may take place via a bus system which connects different vacuum generators in a more complex system with each other and possibly with a central control unit. In particular, the transmitted data may be the above operating data. However, as explained in greater detail below, other data are also possible (such as an identification code). Using the data transfer device data from the vacuum generator may be transferred to the recognition unit. It is conceivable that the vacuum generator can change the operating data stored in the recognition unit and/or adjust the current operating status. The vacuum generator could also receive data from the vacuum generator to the recognition unit to functionally control of the associated manipulator appropriately. It is also conceivable that changed, adjusted, and/or optimized data could be written back from the vacuum generator to the recognition unit. The data transfer devices may be realized as wireless or cable-free data transfer (for example, as a functional transmission unit). It is also conceivable to utilize a data line between the recognition unit and the vacuum generator.

The recognition unit and the vacuum handling device may be mechanically interconnected, for example, as a structural unit. In particular, the detection unit may be arranged on a unit case of the vacuum handling device, for example combined into one module. The structural unit (including the detection unit and the vacuum handling device) may advantageously be releasable connected to the vacuum generator (for example, with a suitable releasable bracket). In particular, the structural unit (including the detecting unit and the vacuum handling device) may be configured so as to be plugged into and subsequently released from the vacuum generator (advantageously so as to be exchangeable). This enables a flexible conversion.

The recognition unit may include an optical state display, such as a light indicator, with which the functional status of the vacuum handling device can be displayed via a value determined from the operating data. The status display device can be configured so that display is carried out without supply of electrical energy (or de-energized). In a complex system, the assigned recognition unit can directly recognize a vacuum handling device to ensure that it functions correctly. So, for example, a functional status "leaking" can be displayed. The status display device could be a multicolored light display, whereby a light signal of a first color (for example, green) indicates proper functioning, and a light signal of a second color (for example, red), indicates a malfunction. The status display device may be advantageously configured and operated in such a way that, together with the recognition unit, the functional status is also displayed for the associated vacuum handling device of the vacuum generator, or the handling system separately (for example, unconnected). This allows control of the functionality before installing in a larger system, for example.

The recognition unit may also include at least one signal input for measuring signals from a sensor. A suitable pressure measuring sensor can be provided on the assigned vacuum handling device which is connected to the recognition unit with a signal input. The sensor can, for example, be put on a vacuum line which connects the vacuum generator to the vacuum handling device. This is particularly advantageous if the vacuum generator supplies several handling devices, whereby a malfunction can be individually assigned to a specific handling device.

The detection unit has a memory device (such as on an identification unit) from which an individually associated identification code is read out. The vacuum generator, in particular, may have a corresponding readout unit for reading the identification code. The reading can be done via the data transmission facility described above, for example. The detection unit may be integrated in a convenient way in a connector as part of a plug connection to a port of the vacuum generator.

The vacuum generator can be a pneumatically operated vacuum (for example, ejector). Here, the system may utilize a compressed air supply which supplies at least one vacuum generator with compressed air (in particular, several or all of the vacuum generators). However, other types of vacuum generators could be utilized, such as electric vacuum generators powered by a central electric power supply.

The system may utilize a central control unit (especially a memory programmable storage—MPS) to control the at least one vacuum generator. The vacuum generator receives process data from the central control device. However, the operating data is referenced by the vacuum generator directly from the recognition unit of the respective connected handling device, so as to effect proper control and vacuum supply. Only the general process parameters need to be given from the central control unit.

The system may be a bus system (for example, a field bus) via which the vacuum generator is connected to the central control device. The recognition units can also be connected to the bus system and can refer to suitable bus communication devices. A bus-based design allows for easy expansion of the system to further handling spaces.

The data stored in the operational data detection unit are advantageously provided with a mobile data reading device which can be read out, such as via a wireless communication link. The recognition units can refer to suitable bus communication devices.

In one embodiment, the present invention is directed to a method for operating a handling system. The vacuum generator reads operating data for the handling devices connected thereto directly from the respective associated recognition units. Advantageously, the vacuum generator is then controlled depending upon the read out operating data; in particular, the vacuum generator operates the handling device as a function of the read out of operating data. For example, the vacuum performance or other operating parameters of the vacuum generator can be changed if leakage occurs in a connected vacuum handling device or its typical evacuation time varies. For example, for a handling device realized as a vacuum gripper, a holding threshold H2 can be stored in the assigned recognition unit; when H2 is reached, the workpiece is presumably attached to the vacuum gripper. In addition, a maximum negative pressure value H1 can be referenced in the recognition unit which, once reached, reliable holding of the workpiece can be presumed and further evacuation is therefore no longer necessary. According to the present invention, these specific operating data needed for the handling devices need not be referenced in a central control; rather, they can be directly read from the respective vacuum generators from the recognition units connected to the handling devices.

Reading the operating data may be done after changing or newly installing a handling device to the system. Subsequently, the system can be put back into service without costly reconfiguration. After the reading, a sub-control unit of the vacuum generator determines the revised and optimized operating data that it re-transfers directly to the detection unit and stores it there. In this respect, the vacuum generator can perform an optimization process and save optimized data back to the detection unit.

The return storage at regular intervals is carried out in cycles at defined functional steps during the operation, or at connecting and/or disconnecting the handling device to the vacuum generator.

The modification or optimization of the operating data can also be made in the identification unit itself. To this end, the recognition unit can read the measurement signals from a sensor which monitor the vacuum handling device and/or the vacuum generator. Changed operating data may then be determined as a function of these measurement signals and stored in the memory device. The detection unit can may have a corresponding data processing device. The recognition unit may also compare data received from the vacuum generator and/or from sensors to setpoints stored in the recognition unit. With deviations from the setpoints, for example, an error message can be issued. Thus, a complete life cycle of the respective handling device can be formed in the memory unit of the recognition device.

BRIEF DESCRIPTION OF THE DRAWINGS

Other objects, advantages, and advantages of the present invention will be readily appreciated as the same becomes better understood after reading the subsequent description taken in connection with the accompanying drawing wherein:

FIG. 1 is a schematic view of a handling system according to one embodiment of the present invention.

DETAILED DESCRIPTION OF THE INVENTION

Further details of the invention will be described in greater detail below with reference to the accompanying figures. FIG. 1 shows a handling system with a vacuum generator 10 and an operating unit. In the example shown in FIG. 1, the operating unit is a vacuum gripper's formed vacuum handling device 12, which is pressure connected over a vacuum line 14 to a vacuum outlet of the vacuum generator 10. In one embodiment, the vacuum generator 10 may be formed as an ejector driven by compressed air supply 16. The system may advantageously include a plurality of vacuum generators connected to associated vacuum handling devices.

The vacuum generator 10 has a sub-control unit 18 which controls the operating state of the vacuum generator 10. The vacuum generator 10 or its sub-control unit 18 is connected to a field bus 20, to which other vacuum generators may also be connected. The field bus 20 is connected to a central control device 22 which can properly control the vacuum generator. Furthermore, the field bus 20 can be connected to a monitoring and/or process visualization display 24. Moreover, the field bus 20 can be connected to a data memory unit, which may be configured as a connected data server 26 or as cloud storage 28, for example.

The vacuum handling device 12 is individually assigned a recognition unit 30. The recognition unit 30 may advantageously be mechanically connected to the vacuum handling device 12, arranged directly with the vacuum handling device 12, or may be provided in a housing of the device 12 or arranged therewith in a common housing. In the representative embodiment illustrated in FIG. 1, a mechanical connection 32 between the vacuum handling device 12 and detection unit 30 is shown schematically. The recognition unit 30 includes an electronic memory device 34, in which operating data for the associated vacuum handling device 12 can be stored and can be subsequently read out. The detection unit 30 may be integrated in a convenient way in a connector 37 as part of a plug connection to a port of the vacuum generator 10".

In order to communicate between the recognition unit 30 and the vacuum generator 10, both units include suitable data transmission devices, such as a cable-based data connection 36, for example.

In particular, a connection to the sub-control unit 18 of the vacuum generator 10 is made so that the vacuum generator 10 is functionally activated by the connected vacuum handling device 12. As an extension, the detection unit 30 can also be connected to a further data transmission device 38 with the central control unit 22, for example, over the fieldbus. In this manner, operating data of the recognition unit 30 can be, for example, transmitted to a central control unit 22.

The vacuum generator 10 may include internal evaluation devices or sensors for monitoring its operating state. In addition, the vacuum generator 10 may include control valves which, for example, can be suitably controlled by the sub-control unit 18. In FIG. 1, these devices are provided with reference number 40 for exemplary purposes.

A sensor 42 (for example, a pressure measurement sensor and/or a volume flow sensor) may be provided to monitor the functional state of the vacuum handling device 12. By way of example, as shown in FIG. 1, the sensor 42 is arranged in the suction pipe 14 to monitor the prevailing vacuum. The detection unit 30 has a corresponding signal input 44, to which the measurement signal from the sensor 42 can be transmitted. The recognition unit 30 also includes a corresponding evaluation device by which the sensor signals can be evaluated.

For further refinement, the detection unit 30 may include an identification unit 46 from which an individually associated identification code of the respective vacuum handling device 12 can be read out. The identification code is in particular readable from the vacuum generator 10 or its sub-control unit 18, for example, over the data transmission device 36. The recognition unit 30 may further include a status display device 48, such as an illuminated display for visualizing the operating status or for displaying a malfunction, for example.

The vacuum generator 10 may read out operating data directly from the memory device 34 required for the operation of the vacuum handling device 12, without having to access the central control device 22 via the field bus 20. In this way, the vacuum handling device 12 can be changed out without extensive reprogramming or data maintenance in the central control unit 22. In one embodiment, the vacuum handling device 12 is releasably connected to the vacuum generator 10, for example via a mechanical change system, thus achieving flexible convertibility of the system.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A handling system having at least one vacuum generator and an associated vacuum handling device connected to and operable via the vacuum generator; wherein the vacuum handling device includes an individually assigned recognition unit having a memory device in which operating data for the vacuum handling device is stored and can be read out, and wherein each vacuum generator includes a respective sub-control unit adapted to control the vacuum generator depending upon data transmitted from the recognition unit; and wherein the memory device of the recognition unit can be read out directly by the sub-control unit, wherein the recognition unit and the vacuum handling device are mechanically interconnected as a structural unit.

2. The handling system as set forth in claim 1, wherein the vacuum generator and the recognition unit have a data transmission element for data transmission from the recognition unit to the vacuum generator and/or from the vacuum generator to the recognition unit.

3. The handling system as set forth in claim 1, wherein the recognition unit has a status display device.

4. The handling system as set forth in claim 3, wherein the status display device is a light display.

5. The handling system as set forth in claim 1, wherein the recognition unit has at least one signal input for measuring a signal of a sensor.

6. The handling system as set forth in claim 1, wherein the recognition unit has an identification unit from which an individually assigned identification code of the vacuum handling device can be read out.

7. The handling system as set forth in claim 1, further including a structural unit including the detecting unit and the vacuum handling device, wherein the structural unit is configured so as to be plugged into and subsequently released from the vacuum generator, wherein the recognition unit is integrated in a connector for connecting the structural unit with the vacuum generator.

8. A method of operating a handling system as set forth in claim 1, wherein the operating data from the vacuum generator connected to the vacuum handling device is read from the recognition unit.

9. The method as set forth in claim 8, wherein a sub-control unit of the vacuum generator determines changed operating data which is transferred to and stored in the recognition unit.

10. The method as set forth in claim 8, wherein the recognition unit reads measurement signals from sensors assigned to one of the vacuum handling device and/or the vacuum generator.

11. The handling system as set forth in claim 1, wherein the vacuum handling device is a vacuum gripper.

* * * * *